April 20, 1965   A. A. GRUNWALD   3,179,910
CLUTCH MEANS FOR VARIABLE RESISTOR
Filed May 15, 1961   5 Sheets-Sheet 1

INVENTOR.
ARTHUR A. GRUNWALD
BY
*Jennings B. Thompson*
ATTORNEY

INVENTOR.
ARTHUR A. GRUNWALD
BY
ATTORNEY

United States Patent Office 3,179,910
Patented Apr. 20, 1965

3,179,910
CLUTCH MEANS FOR VARIABLE RESISTOR
Arthur A. Grunwald, Edwardsburg, Wis., assignor to CTS Corporation, Elkhart, Ind., a corporation of Indiana
Filed May 15, 1961, Ser. No. 109,953
15 Claims. (Cl. 338—180)

This invention relates in general to variable resistors and particularly to variable resistors which are operated by the rotation of a threaded shaft.

This type control is used most commonly as "trimmers" in electrical circuits. As such, they are adjusted infrequently after the circuit has been initially "trimmed." Since one of the principal uses of this type control is found in guided missiles and other types of space vehicles and since they are adjusted infrequently, it is of great importance that these controls have the smallest physical dimensions possible.

As these controls grow physically smaller, the strength of the individual parts is necessarily reduced and they become more susceptible to damage. These leadscrew operated controls are particularly vulnerable when they are being adjusted. The operator rotates the leadscrew with a screw driver or similar tool to move the contact along the resistive and conductive paths. Generally, the only indication that the operator gets that the contact has reached the end of its travel is a sudden increase in the torque required to turn the leadscrew. This usually happens abruptly and if the operator is not expecting it, he will very likely apply an excessive amount of torque to the leadscrew which then acts as a screw jack to spring the housing or cause other damage to the control.

It is the primary object of this invention to provide a leadscrew operated variable resistor which cannot be damaged by excessive rotation of the leadscrew by the operator. It is a further object of the invention to provide a variable resistor equipped with a unique clutch arrangement which will disengage the driving member from the driven member when the driven member reaches the end of its travel in one direction. It is an additional object of the invention to provide clutch means which will not only disengage the driven member from the driving member but which will maintain the driven member in position to reengage the driving member when the direction of rotation of the driving member is reversed.

The invention which accomplishes these objects may be briefly summarized as comprising a variable resistor having a leadscrew which, when rotated, causes contact means to move along a resistive path but which becomes disengaged from the contact means when the contact reaches the end of its travel along the resistive element or path of the variable resistor. The invention is equally applicable to both the rectilinear type and the rotary type of variable resistors. In both types, the leadscrew engages thread engaging members provided on the driver of the contact. In the rectilinear type of variable resistor, the threads of the leadscrew are removed at each end so that the thread engaging members on the driver simply move out of engagement with the threads at each end of its travel. In the rotary type variable resistor, a portion of the thread engaging members on the driver is removed so that when the contact carried by the driver reaches either end of its travel along the resistive path, the portion from which the thread engaging members are removed is adjacent the leadscrew and there is only one thread engaging member remaining in contact with the leadscrew. At this point, movement of the driver stops until the direction of rotation of the leadscrew is reversed. Completing the invention and the feature which makes this simple solution to a difficult problem practical is the resilient means, e.g., a spring, arranged to be engaged by the driver when it approaches the end of the resistive element. These springs or spring, as the case may be, allow the invention to be used without having to manufacture the individual parts to extremely close tolerances.

The invention will now be described in detail, making reference to the accompanying drawings in which.

The rectilinear type

Figure 1:
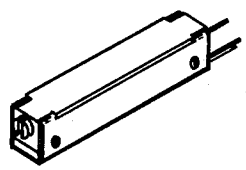
FIGURE 1 is an isometric view of a rectilinear type variable resistor embodying this invention, drawn to scale to give an indication of its actual size.
Figure 2:
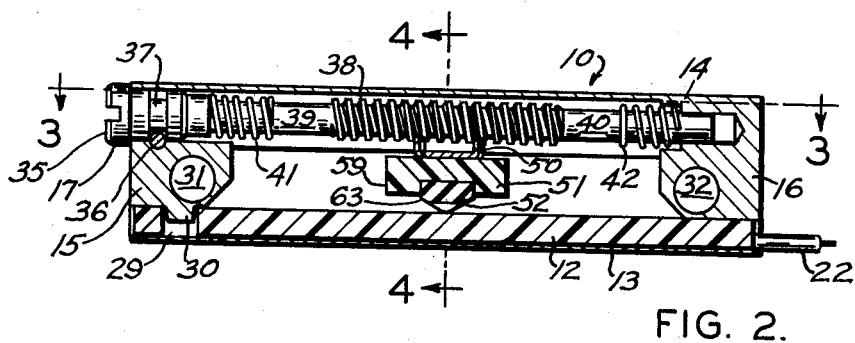
FIGURE 2 is an enlarged vertical, longitudinal, sectional view of the control of FIGURE 1 showing the contact assembly approximately midway between the end walls of the control.
Figure 3:
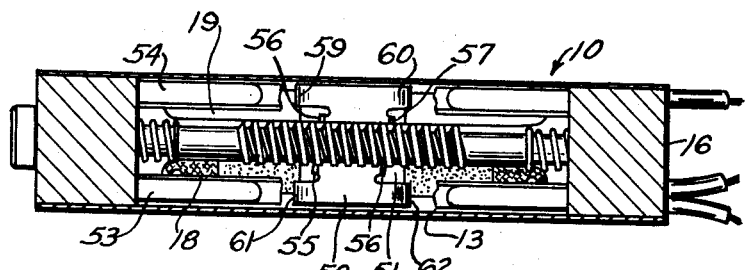
FIGURE 3 is a sectional view of the control of FIGURE 1 taken along the lines 3—3 of FIGURE 2, assuming that FIGURE 2 shows the resistor in full.
Figure 4:
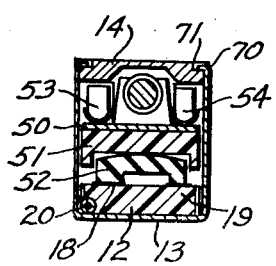
FIGURE 4 is a cross-sectional view taken along lines 4—4 in FIGURE 2 showing the relationship of the members of the contact assembly, assuming that FIGURE 2 shows the resistor in full.

The invention will first be described with regard to its application to a rectilinear type variable resistor as illustrated in FIGURES 1–8.

The reference numeral 10 indicates the control generally. Making up the housing of the control is the base 12, a U-shaped bottom cover 13 and a top cover 14 equipped with end walls 15 and 16. The U-shaped bottom cover 13 maintains the base 12 in position against the end walls 15 and 16 through a plurality of tangs 70 which are bent over into slots 71 provided in the top cover. These housing members combine to provide a completely enclosed elongated space within which operate the leadscrew and the contact assembly, the two moving members of the control.

The end walls 15 and 16, which are integral parts of the top cover 14, rotatably support the leadscrew 17. Also located in the end walls are the transverse openings 31 and 32 which extend not only through these end walls, but through the U-shaped bottom cover 13 to provide means for mounting the control. This is usually done by arranging two parallel rods which pass through the holes 31 and 32 and allow a number of these controls to be stacked on the rods in side by side relationship.

The base 12 is made from a nonconductive material, preferably a ceramic, and is generally rectangular in cross-section. Mounted on the base in parallel relationship are the resistive path 18 and the conductive path 19. Appropriate recesses are provided on the bottom side of the base to accommodate the leads 20 and 21 which are connected to the extreme ends of the resistive path 18 and the lead 22 which is connected to the conductive path 19.

At one end of the base, a hole 29 is provided to receive the pin 30 formed on the end wall 15. The engagement of the pin 30 in the hole 29 serves to prevent relative movement between the base 12 and the top cover 14.

The leadscrew 17 has a slotted head 35 so that it can be rotated by a screw driver or similar tool. It is rotatably mounted in the two end walls 15 and 16 and spans the opening above the resistive and conductive paths on the base. A transverse pin 36 passes through the end wall 15 and engages the groove 37 in the leadscrew and prevents relative longitudinal movement between the leadscrew and the end walls. In the preferred form of the invention, the leadscrew is equipped with modified square threads 38, and, as can be seen in the drawings, only the middle portion of the leadscrew is threaded, leaving two unthreaded areas 39 and 40 on each side of the threaded portion. Installed in these unthreaded portions and surrounding the leadscrew are the coil springs 41 and 42.

The contact assembly comprises the driver 50, the drive block 51, the contact 52, and the two leaf springs 53 and 54. The driver is formed from a flat piece of spring steel and has four arms 55–58 up, and four arms 59–62 down. The arms 55–58 engage the threads 38 and move longitudinally along the threads as the leadscrew is rotated. The pair of arms 55 and 56 and the pair 57 and 58 each engage an individual thread on the leadscrew. In other words, the arms 55 and 56, and the arms 57 and 58 are offset from each other on the same angle as the helix angle of the threads 38 and are, in fact, portions of the internal thread form designed to mate with the threads on the leadscrew. This is clearly illustrated in FIGURE 3. These four arms perform in exactly the same manner as a half nut. A full nut which would encompass the entire circumference of the leadscrew would perform equally as well; however, for ease of assembly, the half nut or its equivalent, the driver 50 with its four upwardly extending arms or thread engaging members, are preferred.

The arms 59–62 secure the driver 50 to the drive block 51. The drive block is preferably made of nonconductive material so that the driver, the leadscrew, and the two leaf springs will be electrically insulated from the current carrying members of the control. In fact, none of the metal or conductive members of this control will be "hot" when the control is in use. This allows the control to be handled, adjusted, etc. as desired without fear of electrical shock to the operator.

The drive block 51 has a recess 63 which is designed to receive the contact 52 and cause it to move along the resistive path 18 and the conductive path 19 as the driver moves along the leadscrew. The contact is electrically conductive, of course, and serves to electrically connect the resistive path 18 with the conductive path 19. In the preferred form of the invention, as illustrated in the drawings, the contact has one convex surface in engagement with the resistive and conductive paths and a convex surface on the opposite side in engagement with the drive block. The particular advantages of this shape of contactor when combined with the other features of the contact assembly are fully described in the co-pending application, Serial No. 121,173, now patent No. 3,096,500, filed June 30, 1961 entitled "Variable Resistor."

The leaf springs 53 and 54 are compressed between the top cover 12 and the driver 50 and exert a downward force which is transmitted through the driver 50 and the drive block 51 to the contact 52 to positively hold the contact in engagement with the resistive and conductive paths.

Operation

To change the amount of resistance in the circuit, the operator rotates the leadscrew 17 with a screw driver or similar tool. As the leadscrew is rotated, the arms 55–58 on the driver 50 move longitudinally along the threaded portion of the leadscrew. This, in turn, causes driver 50 and the drive block 51 to move the contact 52 longitudinally along the resistive and conductive paths, 18 and 19.

Figure 5:
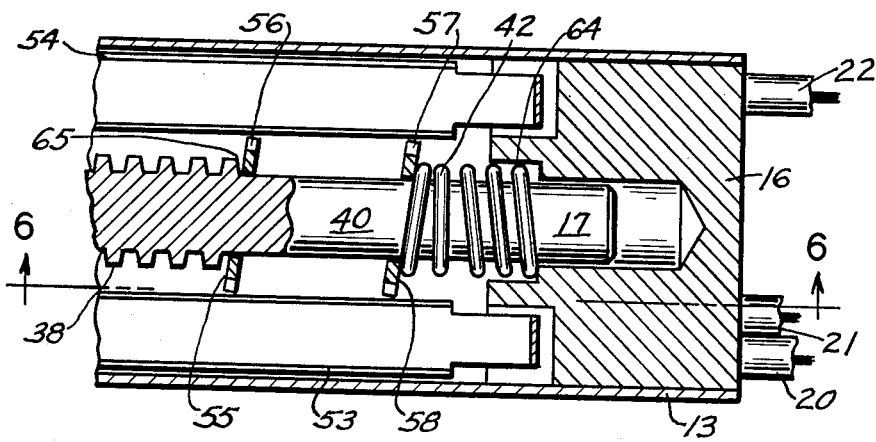
FIGURE 5 is a fragmentary retailed view taken substantially on the same plane as in FIGURE 3 but showing the contact assembly at the extreme end of its travel in one direction.
Figure 6:
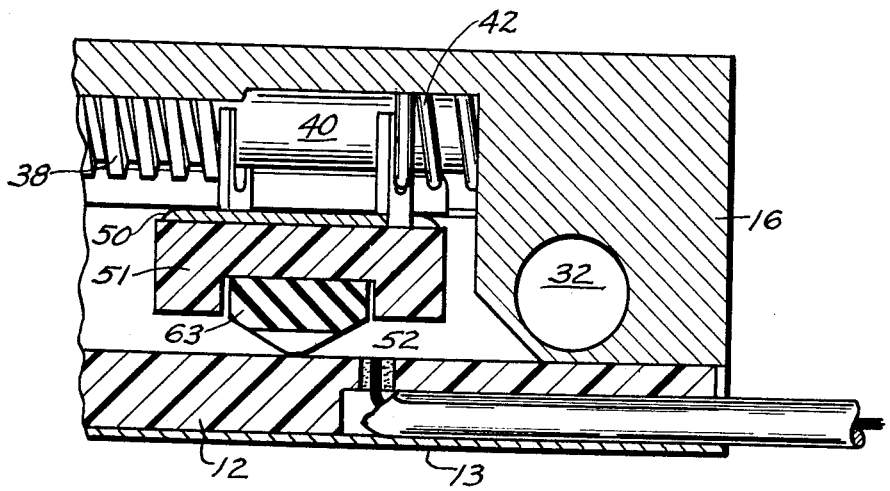
FIGURE 6 is a cross-sectional view taken along lines 6—6 of FIGURE 5.
Figure 7:
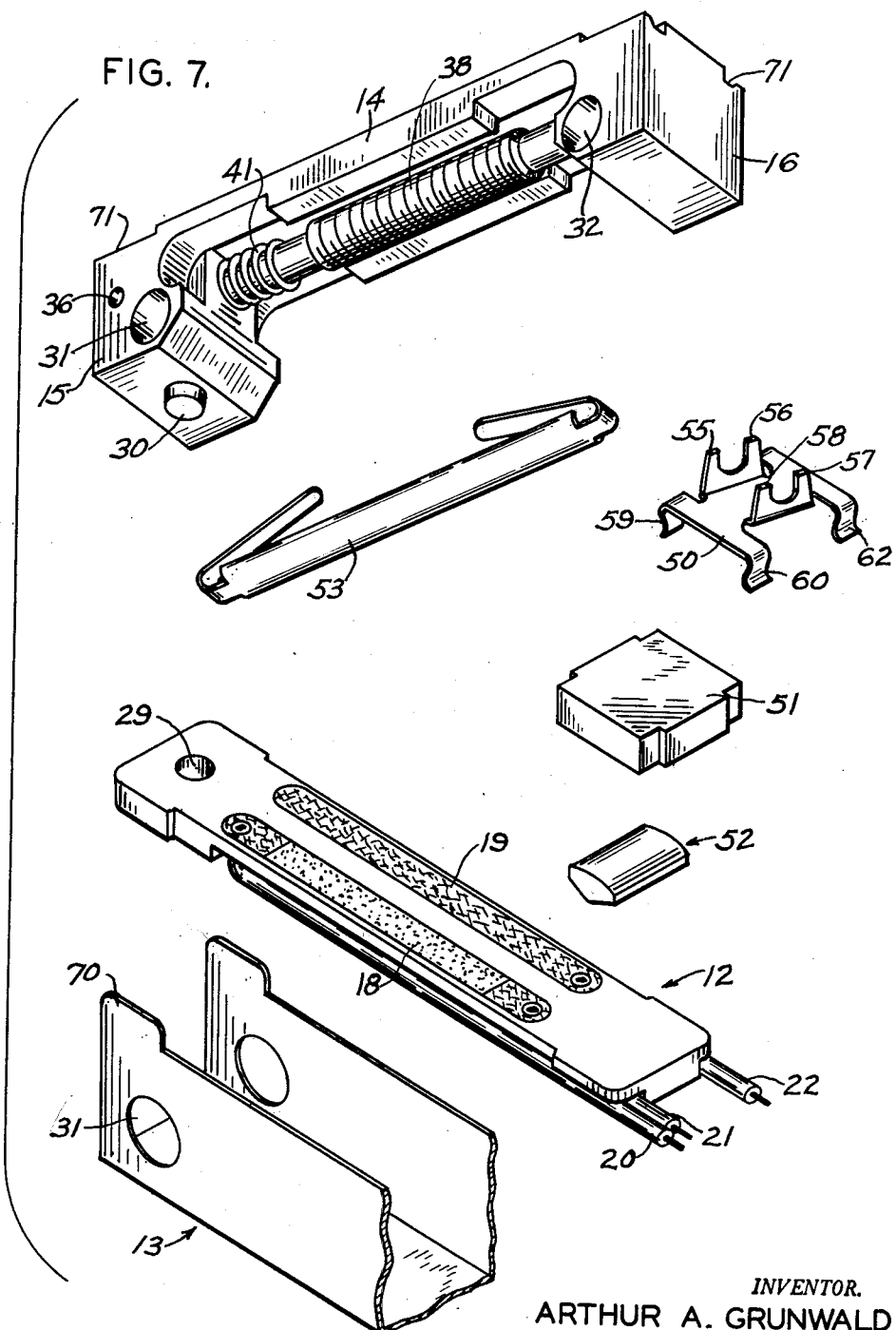
FIGURE 7 is an exploded isometric view of the control of FIGURE 1.

If the operator continues to rotate the leadscrew after the driver reaches the end of the threaded portion, the following will happen: The arms 55–58 of the driver 50 will move out of engagement with the threads as shown in FIGURE 5, compressing the coil spring 42 between the arms 57 and 58 and the end wall 16. (As shown, the end wall 16 is counterbored at 64 to allow a longer spring to be used.) When the arms 55 and 56 reach the end of the threaded portion, no further longitudinal movement of the contact means will occur and as the leadscrew continues to rotate, the arms, the driver, and consequently the contact will simply oscillate between the position shown in FIGURE 5 and a position slightly further toward the end wall which occurs when the furthermost point of the thread 38, indicated by the number 65, moves into engagement with the arm 55. Usually, when the driver reaches the end of the threaded portion of the leadscrew, the contact is riding on the termination of the resistive path and its oscillation against the end of the thread will not change the resistance in the circuit.

Clearly, the above described structure will insure that excessive rotation of the leadscrew in either direction will not result in damage to the control. When the operator reverses the direction of rotation, the spring 42 will maintain the arms 55 and 56 in engagement with the thread 38 so that they will be picked up by the thread again and moved back along the resistive and conductive paths in the opposite direction. Should the operator continue to rotate the leadscrew, the arms 55–58 will reach the unthreaded portion at the other end of the leadscrew and in combination with the spring 41 function in the same manner as described above.

The rotary type

The invention is equally useful in connection with variable resistors with arcuate resistive paths and which also use leadscrews to operate the control. This type control is commonly referred to as a "square trimmer."

Figure 8:
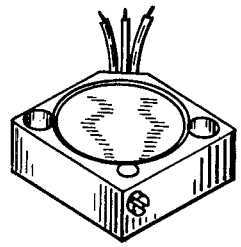
FIGURE 8 is an isometric view of a rotary type variable resistor embodying the invention, drawn to scale to give an indication of its actual size.

FIGURE 8 is an isometric projection of a square trimmer drawn to scale. The commercial embodiment of this invention is one-half inch square and three-sixteenth's of an inch deep. The control is contained in a square cup-shaped metal housing member 110, which, when closed by the top cover plate 111, completely encloses the control except for the head 112 of the leadscrew 113 which protrudes through one of the side walls of the housing 110 and the opening 114 which provides a passageway for the leads 115, 116, and 117. These leads are accommodated in the housing in the section 118 of reduced diameter which combines with the section 119 of larger diameter to provide a shoulder 120 which supports the base 121 above the space 118.

The base 121 is made of nonconductive material and supports the resistive path 122 and the conductive path 123. The resistive path is arcuate and encircles the conductive path which in this case is a circular area of conductive material centrally located on the base 121. The leads 115 and 116 pass through holes provided in the base and are connected to each end of the resistive path. The lead 117 passes through the base also and is connected to the conductive path.

Figure 9:
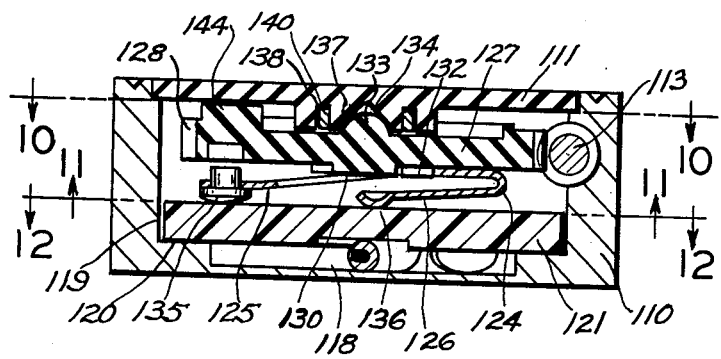
FIGURE 9 is an enlarged cross-sectional view taken through the center of the control of FIGURE 8.

Bridging the resistive and conductive path is the contact 124. It is stamped from thin metal plate and formed, as illustrated in FIGURE 9, to provide two spring arms 125 and 126, which maintain the contact buttons 135 and 136 in contact with the resistive and conductive paths respectively. The contact is attached to a circular driver 127 so that as the driver is rotated, the contact button 135 moves along the resistive path 122 while the contact button 136 remains approximately in the center of rotation in engagement with the conductive path 123.

Figure 11:
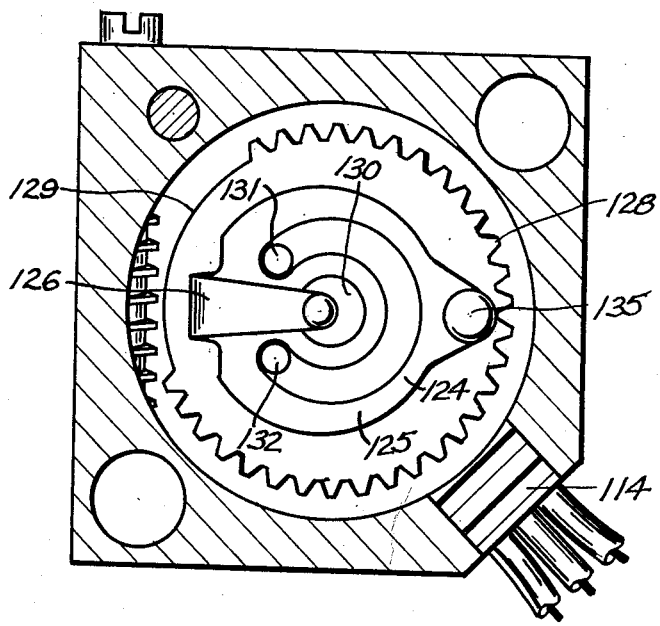
FIGURE 11 is a view taken along line 11—11 of FIGURE 9 showing the construction of the contact and the method of attaching it to the driver.
Figure 12:
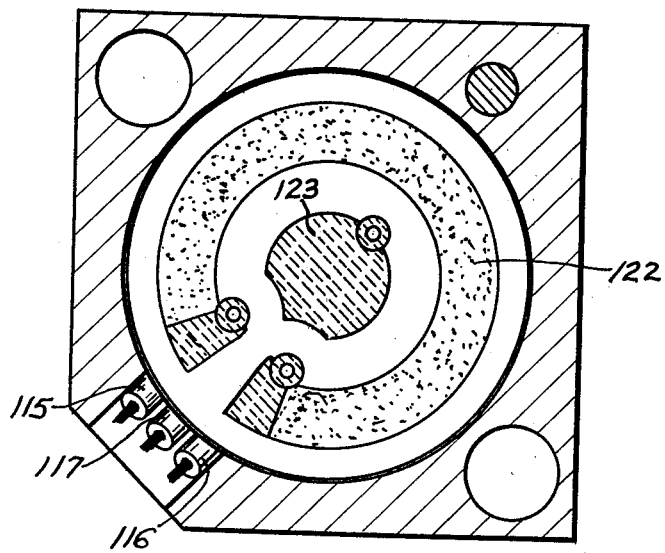
FIGURE 12 is a sectional view along line 12—12 of FIGURE 9.

The driver 127 is made from nonconductive material such as nylon and is formed into the shape illustrated by molding. It is equipped with gear teeth or thread engaging members 128 which extend completely around its periphery except for the section 129, the driver generally being referred to as a mutilated gear. Bosses 130, 131, and 132 are provided to engage the contact 124 as shown in FIGURE 11 and to transmit the rotation of the driver to the contact and to prevent the contact from moving laterally.

A boss 133 is provided on the opposite side of the driver 127 to engage the cone-shaped opening 134 in the cover 111 and act as both a thrust and radial bearing for the driver. The distance between the cover 111 and the base 121 is so arranged that the contact arms 125 and 126 are forced from their relaxed position toward the driver when the control is assembled. The contact arms thus act as springs which exert a force against the driver holding it in position against the bearing 134, while simultaneously exerting an equal force against the base 121 through the resistive and conductive paths which holds it firmly against the shoulder 120. This spring action also insures that the contact buttons 135 and 136 are held firmly against the resistive and conductive paths respectively, thus providing the required contact pressure.

Figure 10:
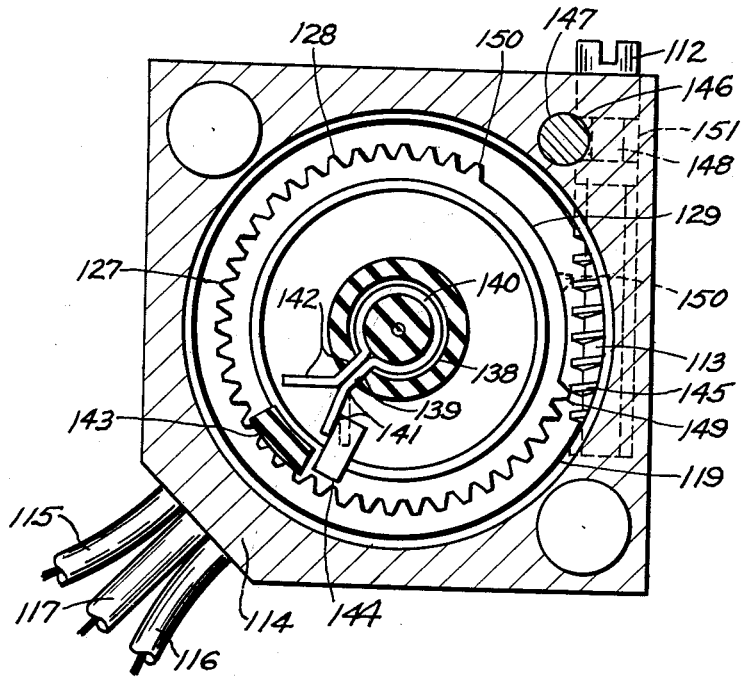
FIGURE 10 is a view taken along line 10—10 in FIGURE 9 showing the arrangement of the spring, driver, and leadscrew, assuming that FIGURE 9 shows the resistor in full.

The bearing 134 is formed in a boss 137 formed on the cover 111. As best seen in FIGURE 10, this boss also contains a circular groove 138 which completely encircles the bearing 134 and is connected to the outside of the boss through a radial groove 139. These grooves receive the spring 140 which has a circular body portion and two legs 141 and 142. The body portion fits the circular groove 138 and the two legs are received in the radial groove 139. The two legs pass through the radial groove in side by side relationship and then fork and continue outward at an angle to each other of approximately 60–70°. As the legs 141 and 142 pass through the groove 139, they are directed straight toward the boss 143 which is formed integrally on the cover 111. (It is designated the "cover stop" since it coacts with a boss on the driver designated a "driver stop" to stop the rotation of the driver after it has rotated a predetermined amount.) The angle at which the legs fork is such that the distance between the ends of the legs is somewhat greater than the length of the cover stop 143. They are also arranged so that they will not hit the stop when bent toward each other. The driver 127, however, is equipped with a boss 144, which is the "driver stop" described above, and which is wide enough to engage both the spring legs and the cover stop 143.

Arranged to rotate the driver 127 by engaging the gear teeth or thread engaging members 128 is the leadscrew 113. The leadscrew is located in a hole 151 drilled through one side of the housing 110. The hole intersects the circular opening 119 in the housing and stops just before passing completely through the housing. With the hole intersecting the opening 119, when the leadscrew is installed, a portion of its threads 145 will extend into the opening also. Since the hole and leadscrew lie in the same plane as the driver 127, the threads 145 on the leadscrew engage the gear teeth 128 on the driver to, in effect, form a worm and pinion drive for the contact. The leadscrew is held in position by a pin 146 which is located in the hole 147 and which engages the groove 148 in the leadscrew.

*Operation*

The invention operates as follows: The leadscrew 113 is rotated by the operator, which, in turn, causes the driver 127 to rotate and move the contact button 135 along the resistive path 122 in the manner common to all "square trimmers." As in the rectilinear type variable resistor, it is important that the contact means does not travel too far. To prevent this, the cover stop 143 is provided to engage the driver stop 144. However, if all of the component parts of this control function as intended, these two stops will never engage each other.

Referring to FIGURE 10, as the driver rotates in a clockwise direction, the driver stop 144 engages the spring leg 141 as the toothless section 129 on the periphery of the driver moves adjacent to the leadscrew. In the position shown in FIGURE 10, the driver stop 144 has forced the spring leg 141 from the position indicated by the dotted lines and only the tip of the tooth 149 (the tooth adjacent the toothless section 129) is engaging the threads of the leadscrew. In this position, the leadscrew is free to rotate without causing further rotation of the driver in a clockwise direction.

When the direction of rotation of the leadscrew is reversed, the spring leg 141 will urge the tooth 149 back into engagement with the threads on the leadscrew. The driver may then be rotated in a counter-clockwise direction until the driver stop 144 engages the spring leg 142. At this point, the tooth 150 will be moving out of engagement with the threads 145 on the leadscrew as the tooth 149 did at the extreme end of clockwise rotation. The spring leg 142 will be bent toward the other leg by the driver stop 144 until just before the driver stop engages the cover stop 143. The tooth 150 will then be at the place where additional rotation of the leadscrew will cause no further rotation of the driver. This position of the tooth 150 is indicated by dotted lines in FIGURE 10.

From the above description of the invention, as applied to both the rectilinear type variable resistor and the rotary type variable resistor, it is clear that it provides a simple, efficient solution to a troublesome design problem in the variable resistor field.

What is claimed as my invention is:

1. A variable resistor comprising: a housing, a base of nonconductive material supported by the housing, a resistive path and a conductive path disposed on the base, a leadscrew rotatably mounted in the housing and equipped with a screw thread, contact means electrically connecting the resistive and conductive paths and equipped with a plurality of thread engaging members which engage the threads on the leadscrew so that as the leadscrew is rotated the contact means move along the conductive and resistive paths, and spring bias means arranged in the housing to engage the contact means as the contact means approaches the end of its travel in one direction to resiliently urge the contact means in the opposite direction, the variable resistor being further characterized by the fact that the number of thread engaging members on the contact means and the length of the screw thread on the leadscrew are so constructed and arranged that only one thread engaging member is in engagement with the screw thread on the leadscrew when the contact means reaches the end of its travel in one direction.

2. A variable resistor comprising: a housing, a base of nonconductive material supported by the housing, a resistive path and a conductive path supported by the base, a contact electrically connecting the resistive path and the conductive path, a leadscrew rotatably mounted in the housing and equipped with a screw thread, a driver equipped with substantially rigid thread engaging means, said thread engaging means being arranged to engage the screw thread on the leadscrew, said driver being arranged to engage the contact so that as the leadscrew is rotated, the contact is moved along the resistive and conductive paths by the driver, and spring bias means arranged in the housing to be deformed by the driver when the contact reaches the end of its travel, said spring bias means being more resilient than said thread engaging means whereby upon coaction of the spring bias means against the thread engaging means greater deformation occurs to the spring bias means.

3. A variable resistor comprising: a housing provided with a base of nonconductive material, a resistive path supported by the base, a leadscrew journaled in the housing and having a threaded section and unthreaded sections of reduced diameter adjacent each end of the threaded section, contact means engaging the threaded section of the leadscrew and the resistive path so that as the leadscrew is rotated, the contact means is forced rectilinearly along the resistive path, and spring bias means disposed adjacent to the unthreaded sections of the leadscrew and arranged to be compressed by the contact means as it moves from the threaded section into either of the unthreaded sections of the leadscrew.

4. A variable resistor comprising: a housing provided with a base of nonconductive material, resistive and conductive paths disposed in spaced parallel relationship on the base, a leadscrew journaled in the housing and having a threaded section and unthreaded sections adjacent each end of the threaded section, the leadscrew being disposed in spaced parallel relationship to the conductive and resistive paths, spring bias means disposed adjacent to the unthreaded sections of the leadscrew, and contact means engaging the conductive and resistive paths on the base and the threaded section of the leadscrew so that as the leadscrew is rotated, the contact means will move rectilinearly along the resistive and conductive paths.

5. A variable resistor comprising: housing means, a base of nonconductive material supported by the housing means, a resistive path and a conductive path in spaced parallel relationship on the base, a leadscrew rotatably mounted in the housing means and equipped with threads throughout its mid-portion and with unthreaded sections at each end of the threaded portion, contact means electrically connecting the resistive path and the conductive path and equipped with a plurality of substantially rigid thread engaging members which engage the thread on the leadscrew so that as the leadscrew is rotated, the contact means will move along the resistive and conductive paths, and spring bias means disposed adjacent to the unthreaded sections of the leadscrew and arranged to be compressed by the contact means when the contact means reaches the end of its travel in one direction, the variable resistor being further characterized by the fact that when the contact means reaches the end of the resistive path only one substantially rigid thread engaging member is in contact with the threads on the leadscrew.

6. A variable resistor comprising: housing means, an arcuate resistive path and a conductive path supported by the housing means, a disc rotatably supported by the housing means, a contact attached to the disc and in engagement with the resistive path so that as the disc is rotated the contact will move along the resistive path, a plurality of thread engaging members on the periphery of the disc, a leadscrew equipped with threads rotatably supported by the housing means arranged to engage the thread engaging members on the disc, and spring means supported by the housing means, said spring means being arranged to be stressed by the disc when the contact reaches the end of the resistive path and when only one thread engaging member on the disc is in contact with the threads on the leadscrew.

7. A variable resistor comprising: a cup-shaped housing, a cover arranged to close the open end of the housing, a base of nonconductive material supported by the housing, an arcuate resistive path and a conductive path supported by the base, contact means in engagement with the resistive path and rotatably supported by the cover and the base and equipped with a plurality of thread engaging members, a leadscrew rotatably mounted in the housing and equipped with threads which engage the thread engaging members on the contact means so that as the leadscrew is rotated the contact means will be caused to move along the resistive path, and spring means supported by the cover and arranged to be stressed by the contact means when the contact means reaches the end of its travel along the resistive path and when only one thread engaging member is in contact with the threads on the leadscrew.

8. The combination according to claim 7 in which the contact means comprises a mutilated gear of nonconductive material equipped with thread engaging teeth on a substantial portion of its periphery and a contact attached to the disc and arranged to move along the resistive path when the mutilated gear is rotated by the leadscrew.

9. The combination according to claim 8 in which the cover is equipped with a boss having a cone-shaped recess and the mutilated gear is equipped with a spherically-shaped boss which is received in the cone-shaped recess to provide a bearing for the mutilated gear.

10. The combination according to claim 9 in which the boss on the cover is equipped with a circular groove cooperating with a radially outwardly extending groove, the spring means comprises a circular member of spring material equipped with two radially outwardly extending arms disposed in the groove, and a stop member on the gear engages one of the arms as the contact approaches the end of its travel along the resistive path.

11. A variable resistor comprising a housing, a base of nonconductive material supported by the housing, a resistive path and a conductive path in spaced parallel relationship disposed on the base, a leadscrew rotatably mounted in the housing and equipped with threads throughout its mid-portion and with unthreaded sections at each end of the threaded portion, a driver operably associated with the leadscrew, a drive block of nonconductive material engaged by the driver, the driver being provided with a plurality of thread engaging members engaging the threads of the leadscrew, a contact connecting the resistive path and the conductive path and constrained to move with the drive block upon rotation of the leadscrew, and resilient means disposed on the unthreaded sections of the leadscrew and arranged to be compressed by the driver when the contact reaches one end of the resistive path, one thread engaging member being in contact with the threads of the leadscrew when the contact reaches the end of the resistive path.

12. The variable resistor of claim 11, wherein the driver is provided with upwardly extending arms engaging the threads of the leadscrew, the arms moving along the leadscrew as the leadscrew is rotated.

13. The variable resistor of claim 12, wherein the driver is provided with downwardly extending arms engaging the drive block of nonconductive material, the drive block being provided with a recess receiving the contact.

14. A variable resistor comprising a housing, a base of electrically nonconductive material supported by the housing, a resistive path and a conductive path disposed on the base, a leadscrew rotatably mounted in the housing, contact means electrically connecting the resistive and conductive paths, a plurality of thread-engaging members carried by the contact means engageable with the threads of the leadscrew whereby rotation of the leadscrew moves the contact means with respect to the resistive and conductive paths, a stop member mounted in the housing, and spring means engageable with the stop member as the contact means approaches the end of its travel in one direction for resiliently urging the contact means in the opposite direction, only one of the thread-engaging members engaging the threads of the leadscrew when the contact means reaches the end of its travel in the one direction.

15. The variable resistor of claim 14, wherein the contact means comprises a mutilated gear and a contactor, the contactor is carried by the gear and electrically connects the resistive and conductive paths, and the spring means is mounted in the housing in fixed relationship to the resistive path for urging the contact means in the opposite direction when the stop member engages the spring bias means and the one of the thread-engaging members engages the threads of the leadscrew.

References Cited by the Examiner

UNITED STATES PATENTS

| | | | |
|---|---|---|---|
| 2,895,116 | 7/59 | Morrison | 338—180 |
| 2,945,199 | 7/60 | Mucher et al. | 338—180 |
| 2,946,975 | 7/60 | Caddock | 338—183 |
| 2,954,539 | 9/60 | Blanco | 338—180 |
| 2,976,508 | 3/61 | Waters | 338—180 |
| 2,989,718 | 6/61 | Bourns | 338—181 |
| 3,096,500 | 7/63 | Daly et al. | 338—183 |

RICHARD M. WOOD, *Primary Examiner.*

MARCUS U. LYONS, RAY K. WINDHAM, *Examiners.*